(12) United States Patent  
Bacher et al.

(10) Patent No.: US 9,830,208 B2  
(45) Date of Patent: *Nov. 28, 2017

(54) PROCESSING A GUEST EVENT IN A HYPERVISOR-CONTROLLED SYSTEM

(71) Applicant: International Business Machines Corporation, Armonk, NY (US)

(72) Inventors: Utz Bacher, Dettenhausen (DE); Reinhard T. Buendgen, Tuebingen (DE)

(73) Assignee: International Business Machines Corporation, Armonk, NY (US)

(*) Notice: Subject to any disclaimer, the term of this patent is extended or adjusted under 35 U.S.C. 154(b) by 20 days.

This patent is subject to a terminal disclaimer.

(21) Appl. No.: 14/946,312

(22) Filed: Nov. 19, 2015

(65) Prior Publication Data

US 2016/0132349 A1    May 12, 2016

Related U.S. Application Data

(63) Continuation of application No. 14/924,759, filed on Oct. 28, 2015.

(30) Foreign Application Priority Data

Nov. 11, 2014    (GB) .................................. 1420046.3

(51) Int. Cl.
*G06F 9/54* (2006.01)
*G06F 9/455* (2006.01)
(Continued)

(52) U.S. Cl.
CPC .......... *G06F 9/542* (2013.01); *G06F 9/45558* (2013.01); *G06F 21/53* (2013.01);
(Continued)

(58) Field of Classification Search
CPC ....................................................... G06F 9/542
See application file for complete search history.

(56) References Cited

U.S. PATENT DOCUMENTS 8,966,581 B1 *  2/2015  Gross ...................... G06F 21/33  
                                                                726/2  
9,515,999 B2 * 12/2016  Ylonen ................. H04L 63/062  
(Continued)

*Primary Examiner* — Charlie Sun  
(74) *Attorney, Agent, or Firm* — Lieberman & Brandsdorfer, LLC

(57) ABSTRACT

The embodiments relate to a method for processing a guest event in a hypervisor-controlled system. A guest event triggers a first firmware service for the guest event in firmware. The guest event is associated with a guest, a guest key, and with a guest state and protected guest memory accessible only by the guest and the firmware. The firmware processes information associated with the guest event. The processed information includes information of the guest state and the protected guest memory. A subset of the processed information is received by a hypervisor to process the guest event, and a non-received portion of the information is retained by the firmware. The hypervisor processes the guest event based on the received subset and sends a process result to the firmware triggering a second firmware service for the guest event. The firmware processes the process result together with the retained information to generate modification associated with the guest event. The firmware performs the generated modification associated with the guest event at the protected guest memory.

8 Claims, 6 Drawing Sheets

(51) Int. Cl.
*G06F 21/57* (2013.01)
*G06F 21/53* (2013.01)
*G06F 9/445* (2006.01)
*G06F 9/44* (2006.01)

(52) U.S. Cl.
CPC ............... *G06F 21/57* (2013.01); *G06F 8/63* (2013.01); *G06F 9/4401* (2013.01); *G06F 2009/4557* (2013.01); *G06F 2009/45575* (2013.01); *G06F 2009/45579* (2013.01); *G06F 2009/45587* (2013.01)

(56) References Cited

U.S. PATENT DOCUMENTS

2011/0302400 A1* 12/2011 Maino .................. G06F 21/575
　　　　　　　　　　　　　　　　　　　713/2
2016/0048680 A1* 2/2016 Lutas ................... G06F 21/554
　　　　　　　　　　　　　　　　　　　726/23

* cited by examiner

PROCESSING A GUEST EVENT IN A HYPERVISOR-CONTROLLED SYSTEM

CROSS-REFERENCE TO RELATED APPLICATION

This application is a continuation patent application of U.S. patent application Ser. No. 14/924,759, filed Oct. 28, 2015, titled "Processing A Guest Event In A Hypervisor-Controlled System", which is hereby incorporated by reference, which claims priority under 35 U.S.C. §119 from United Kingdom Patent Application No. 1420046.3 filed on Nov. 11, 2014, the entire contents of which are incorporated herein by reference.

BACKGROUND

The present invention relates in general to data processing systems, and in particular, to a method and a system for processing a guest event in a hypervisor-controlled system.

Customer adoption of public Clouds is limited to non-mission critical data. Very often, core business data is an essential asset to a customer, and data confidentiality is critical for business success. As long as customers do not trust Cloud environments, Cloud adoption of those business sensitive environments stays minimal. Among the main concerns of customers are lack of trust in the Cloud provider and the security of the Cloud.

Trust in the Cloud provider is critical since an administrator of the provider has the capability to fully inspect the customer's workload and data. This potential for a data breach is the reason that many customers are hesitant to utilize public Clouds. Another security threat with respect to public Clouds relates to the threat of a hypervisor breach, i.e. if an attacker gains access to the hypervisor, the customer's workload and data are at risk again.

Current approaches to guarantee confidentiality and privacy are limited to input/output (I/O) protections: network encryption like secure sockets layer (SSL) can be used to encrypt socket connections and disk encryption tools like dm-crypt in LINUX can be used to encrypt data on a disk device. A trusted platform module (TPM) has also been developed to ensure that a boot chain is valid at the time the customer runs its workload, yet not deployed in a Cloud environment. Also, TPMs do not ensure privacy but integrity of the setup at best.

All of these technologies, even if used, do not address the issue that a hypervisor can always fully inspect its guests, where guests may in general be virtual machines on a hypervisor-controlled system, and read memory contents with potentially sensitive data of the image running in the guest. U.S. Patent Publication No. 2011/0302400 A1 describes a method that generally includes receiving, by a trust anchor on a central processing unit (CPU) having a plurality of processing cores, a virtual machine (VM) image. As received, the VM image is encrypted using a VM image encryption key. The method also includes obtaining the VM image encryption key and configuring a first encrypt/decrypt block with the VM image encryption key. The method also includes generating a memory session key and configuring a second encrypt/decrypt block with the memory session key. The method also includes fetching one or more pages of the VM image into a memory accessible by the plurality of processing cores. Each fetched page is decrypted by the first encrypt/decrypt block using the VM image encryption key and subsequently encrypted by the second encrypt/decrypt block using the memory session key.

SUMMARY

It is an objective of the invention to provide a method for securely processing guest data in an untrusted Cloud environment.

Aspects are provided for processing a guest event in a hypervisor-controlled system. A guest event triggers a first firmware service specific for the guest event in a firmware. The guest event is associated with a guest and with a guest state and a protected guest memory accessible only by the guest and the firmware, and a guest key. The firmware processes information associated with the guest event, with the processing comprising information of the guest state and the protected guest memory. Only a subset of the information of the guest state and the protected guest memory is presented to a hypervisor. The subset of the information is selected to suffice for the hypervisor to process the guest event. The firmware retains a part of the information of the guest state and the protected guest memory that is not being sent to the hypervisor. The hypervisor processes the guest event based on the received subset of the information of the guest state and the protected guest memory, and sends a process result to the firmware triggering a second firmware service specific for the guest event. The firmware processes the received process result together with the part of the information of the guest state and the protected guest memory that was not sent to the hypervisor, and generates a state and/or memory modification. The firmware performs the state and/or memory modification associated with the guest event at the protected guest memory.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein is shown in.

Figure 1:
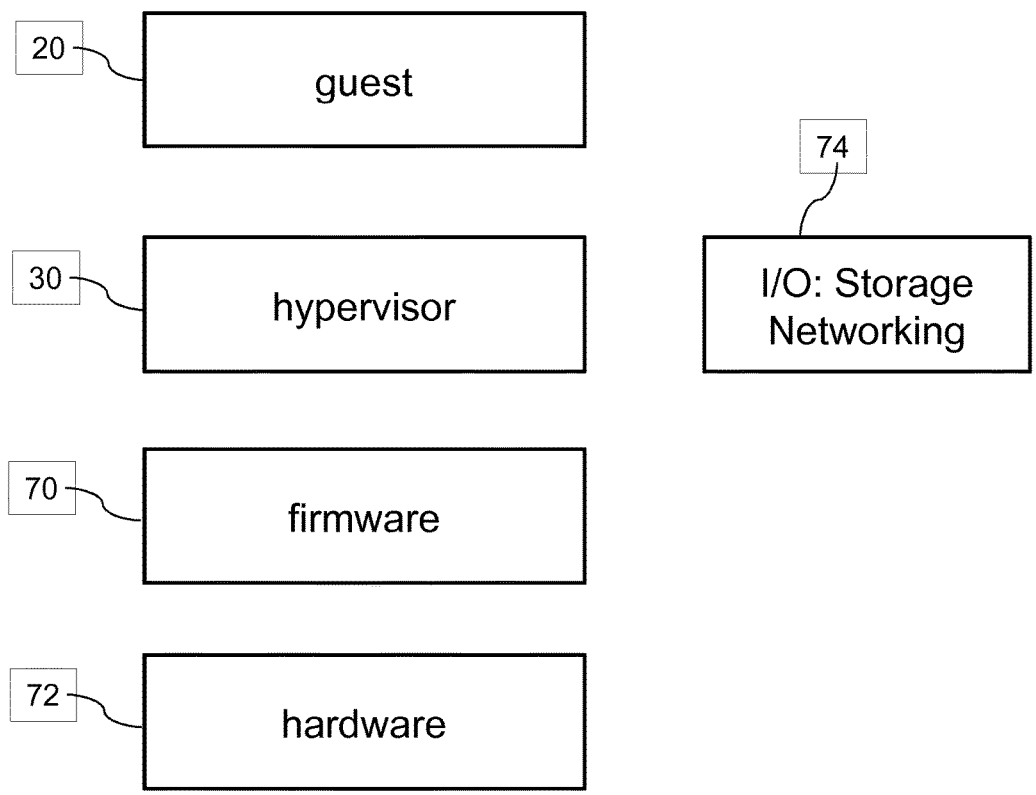
FIG. 1 depicts a stack of components in a hypervisor-controlled system according to prior art.

Other features and advantages will become apparent from the following detailed description of the presently preferred embodiment(s), taken in conjunction with the accompanying drawings.

DETAILED DESCRIPTION

In the drawings, like elements are referred to with equal reference numerals. The drawings are merely schematic representations, not intended to portray specific parameters of the invention. Moreover, the drawings are intended to depict embodiments of the invention and therefore should not be considered as limiting the scope of the invention.

FIG. 1 shows a stack of components in a hypervisor-controlled system according to prior art. The different components comprise one or more guests (20), realized as a virtual machine, running on a hypervisor-controlled system as a virtual server system, consisting of firmware (70), hardware (72), as e.g. one or more CPUs, memory, I/O devices (74) for storage networking. A hypervisor (30) manages the resources of the hardware (72) and I/O devices (74) and allocates appropriate portions of these resources to the guests (20). In a Cloud environment the guest VM (20) is operated by a client or customer, whereas the hypervisor (30) is operated by a Cloud provider, who may be untrusted by the client. The firmware (70) and hardware (72) for the virtual server system are manufactured by a hardware vendor, who may be considered as trusted. It is an objective of the invention to provide a method for securely processing the guest VM (20) in a Cloud environment where the Cloud provider may not be trusted.

In one embodiment, the first firmware service may favorably comprise at least two steps, including processing information associated with the guest event, including but not limited to processing information of the guest state and the protected guest memory, and presenting only a subset of the information to a hypervisor. A sufficient subset of information is selected for the hypervisor to process the guest event, and the portion of the information not sent to the hypervisor is retained by the firmware. In one embodiment, the firmware (70) processes the information associated with the guest event) and presents only a subset of the information of the guest state (52) and the protected guest memory (22) in decrypted form to a hypervisor (30). A sufficient subset of information is selected for the hypervisor (30) to process the guest event. In the firmware retaining step, the firmware (70) retains the portion of the information of the guest state (52) and the protected guest memory (22) that was not being sent to the hypervisor (30).

In one embodiment, the second firmware service may favorably comprise at least one of two steps. These steps include the firmware processing the received process result together with the portion of the information of the guest state and the protected guest memory that was not sent to the hypervisor, generating a state and/or memory modification, and the firmware performing the state and/or memory modification associated with the guest event at the protected guest memory. The firmware processing step comprises the firmware (70) processing the received process result together with the portion of the information of the guest state (52) and the protected guest memory (22) that was not sent to the hypervisor (30). This generates a state and/or memory modification. In the firmware performing step, the firmware (70) performs the state and/or memory modification associated with the guest event at the protected guest memory (22).

Figure 2:
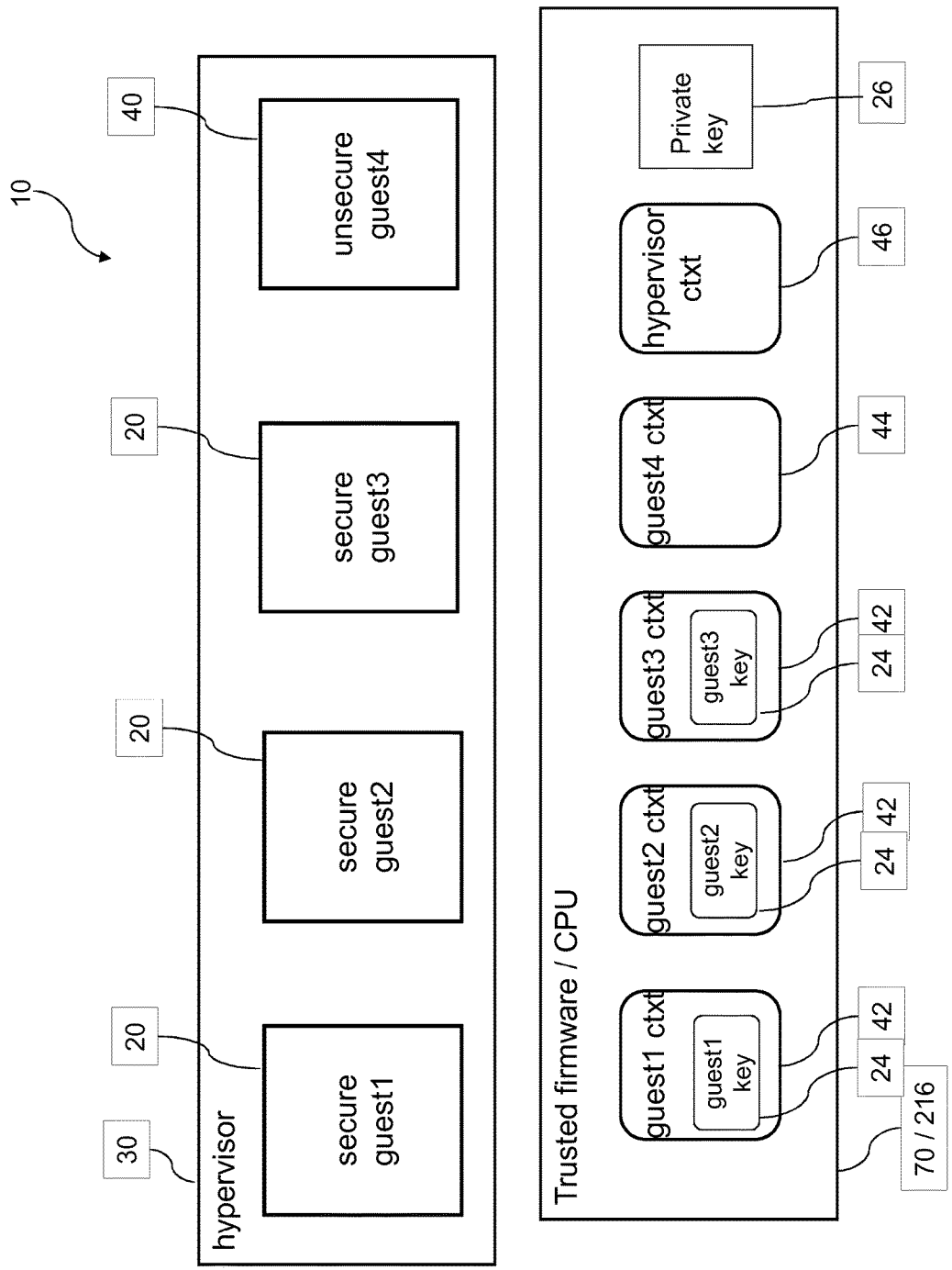
FIG. 2 depicts a general overview of a method for a secure execution of guests in an insecure environment according to an embodiment of the invention.

FIG. 2 gives a general overview of a method for a secure execution of guests 20 in an insecure environment of a hypervisor-controlled system (10) according to an embodiment of the invention. This may be achieved in analogy to a secure socket layer, where secure operation (i.e. messaging) is also achieved over an unsecure medium. A hypervisor (30), which is considered as untrusted, may control secure guests (20) as well as unsecure guests (40) at the same time and in the same system. The system (10), that runs the hypervisor (30) and the guests (20) and (40) on a CPU (216), maintains a specific context (42) for each secure guest (20), a specific context (44) for each unsecure guest (40) and a context (46) for the hypervisor (30) respectively. Each context (42) of a secure guest (20) contains a guest key (24) associated which the secure guest (20). The memory of each secure guest (20) is protected against access form code running in a context that does not belong to the secure guest (20). When accessed from a context not belonging to the secure guest (20), the guest memory (23) is encrypted with the guest key (24) of the secure guest (20). The guests (20) and (40), as well as the hypervisor (30), may run on the system (10) in their own contexts (42), (44), and (46). Also on the system (10) there is the hypervisor (30) running in its own context (46). When a CPU (216) runs in one context it has no access to information maintained by another context. When a CPU (216) runs in a guest context (42) of a secure guest (20), it has access to the guest key (24) of that guest (20) to encrypt and decrypt data of that guest (20). Further, a CPU (216) enters a context of a secure guest (20), unsecure guest (40), or a hypervisor (30) only if it processes code of that secure guest (20), unsecure guest (40), or hypervisor (30), respectively, or if it runs a firmware service in support of that secure guest (20), unsecure guest (40), or hypervisor (30) respectively. The firmware (70) also comprises a private key (26) of the system (10).

Figure 3:
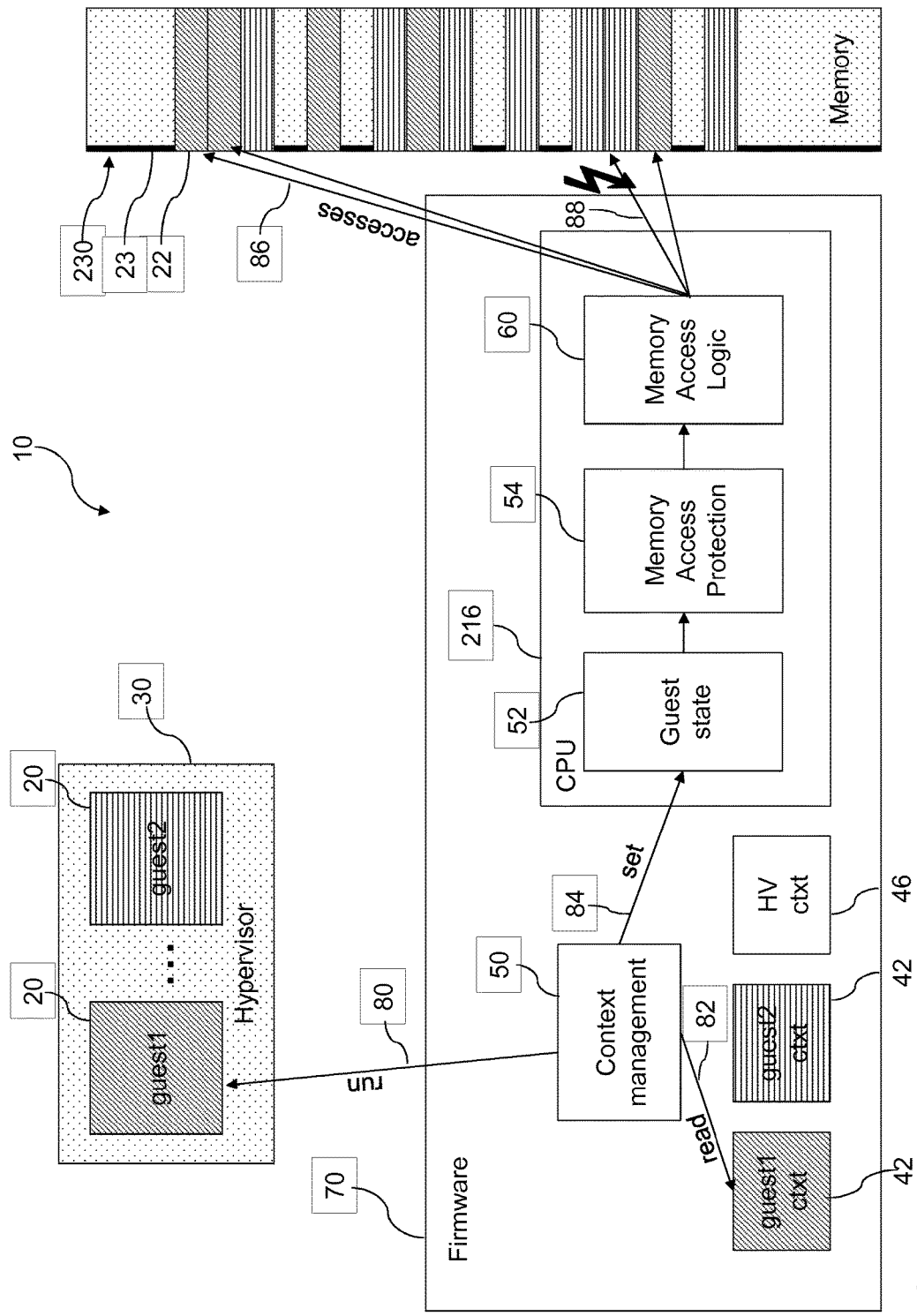
FIG. 3 depicts a system diagram of a hypervisor-controlled system for a secure execution of guests in an insecure environment according to an embodiment of the invention.

FIG. 3 shows a system diagram of a hypervisor-controlled system (10) for a secure execution of guests (20) in an insecure environment according to an embodiment of the invention. Numerals referenced in the following description which are not shown in FIG. 3, reference objects of FIGS. 1 and 2.

First generic functions of an execution of guests (20) in an insecure environment according to an embodiment of the invention will be explained using the diagram in FIG. 3, before the behavior of the hypervisor-controlled system for handling interrupts or interceptions due to a guest event will be discussed.

The diagram in FIG. 3 shows two guests (20), named guest 1 and guest 2, controlled by a hypervisor (30), all components running on a firmware (70) comprising a CPU (216), which is connected to a memory (230). The CPU (216) comprises access means for a state of guest context of the CPU's virtualization function, where the access is controlled based on the context the CPU (216) is in.

The firmware (70) is running a context management function (50), which controls the different contexts under which the guests (20) as well as the hypervisor (30) are operating. The context management function (50) is triggering memory access operations through the CPU (216), where guest state functions (52), memory access protection (54) as well as memory access logic (60) is implemented. The context management function (50) controls running of the guests (20) on the hypervisor (30), as indicated by the operation (80).

The method according to the invention for processing a guest event in a hypervisor-controlled system (10) comprises the following steps as shown in FIG. 3. These steps are referenced in the description. First a guest event, originating from the guest 1 in the embodiment shown in FIG. 3, is triggering a first firmware service being specific for the guest event in the firmware (70), where the guest event is being associated with the guest (20) and with a guest state (52) and a protected guest memory (22) accessible only by the guest (20) and the firmware (70), and a guest key (24). This is controlled by the context management function (50) by reading guest context (42), indicated by operation (82). Secondly the firmware (70) processes information associated with the guest event, including processing information of the guest state (52) and the protected guest memory (22), and presents only a subset of the information of the guest state (52) and the protected guest memory (22) to the hypervisor (30). The subset of the information is selected to be sufficient for the hypervisor (30) to process the guest event. Thirdly, the firmware (70) retains a portion of the information of the guest state (52) and the protected guest memory (22) that was not being sent to the hypervisor (30). Fourthly, the hypervisor (30) processes the guest event based on the received subset, and sends a process result to the firmware (70) triggering a second firmware service being specific for the guest event. Fifthly, the firmware (70) processes the received process result together with the part of the information of the guest state (52) and the protected guest memory (22) that was not sent to the hypervisor (30), generating a state and/or memory modification. Therefore, the context management function (50) sets the guest state (52) in the CPU (216) by operation (84), where information is passed to a memory access protection function (54) and finally to a memory access logic (60), controlling access to the memory (230). Sixthly, the firmware (70) performs the state and/or memory modification associated with the guest event at the protected guest memory (22). This is performed by the memory accesses (86), where memory access (86) is allowed only to the protected memory (22) of the respective guest (20) and not to the memory of a guest which is not the originator of the guest event, as indicated by the operation (88).

The hypervisor (30) has only limited access to data and/or code in the memory (230), because there exist ranges which are encrypted with a guest key (24) and other ranges which are visible to the hypervisor (30). Further there are protected guest memory (22) ranges, which are protected by the firmware (70) and which are also not accessible to the hypervisor (30).

Following, the realization of the handling of interruptions or interceptions by means of firmware services as services implemented in the firmware (70) according to an embodiment of the invention is explained. In a short description, processing a guest event in a hypervisor-controlled system (10) comprises: (i) triggering a first firmware service; (ii) the firmware (70) processing information associated with the guest event, presenting only a subset of the information to a hypervisor (30); (iii) the firmware retaining a part of the information that is not being sent to the hypervisor (30); (iv) the hypervisor (30) triggering a second firmware service; (v) the firmware generating a guest state (52) and/or a protected guest memory (22) modification; and (vi) the firmware performing the guest state (52) and/or protected guest memory (22) modification.

Enabling access for the hypervisor (30) to a memory page by the firmware (70) comprises (i) the hypervisor (30) requesting access to a page of the protected guest memory (22) from firmware (70); (ii) the firmware (70) disabling access for the guest (20) to that page; (iii) the firmware (70) encrypting that page with the guest key (24); and (iv) the firmware (70) enabling access for the hypervisor (30) to that page.

Further enabling access for a guest (20) to a memory page by the firmware (70) comprises (i) the hypervisor (30) providing an encrypted page to the firmware (70); (ii) the firmware (70) disabling access for the hypervisor (30) to that page; (iii) the firmware (70) decrypting that page; and (iv) the firmware (70) enabling access for the guest (20) to that page.

Allowing decryption by the firmware (70) further comprises (i) the firmware (70) computing an integrity value of the page to be encrypted and made accessible to the hypervisor (30); (ii) the hypervisor (30) providing an encrypted page to be added to the protected pages of a virtual machine to the firmware (70); and (iii) the firmware (70) only allowing adding the decrypted page to the protected pages of the virtual machine when the integrity value matches the page.

A secure deployment and execution of a guest (20) comprises providing the guest (20) with the guest key (24) being encrypted with the public key (32) associated with a private key (26) of the hypervisor-controlled system (10) for transfer to the key store (28) of the hypervisor-controlled system (10); providing the hypervisor-controlled system (10) with the private key (26) being stored in the hypervisor-controlled system (10) and being used to decrypt the encrypted guest key (24); and using the guest key (24) to encrypt and decrypt the guest data when being transferred out of or into the protected guest memory (22).

A boot image generation and deployment process covers generating a boot image by a client or customer for the guest (20); encrypting the boot image with the guest key (24); transferring the encrypted boot image to a boot disk; loading the encrypted boot image of a guest (20) by the hypervisor (30) to the guest memory (23); transforming the guest memory (23) into the protected guest memory (22); and decrypting contents of the protected guest memory (22); and starting an execution of a guest (20) as a virtual machine.

An interaction between the guest (20) and the hypervisor (30) further covers a range of the protected guest memory (22) or registers associated with the guest event being not accessible to the hypervisor (30); and extends a virtualization function (34) of the hypervisor-controlled system (10) by access methods to specific guest data associated with the guest event.

An I/O process of a guest (20) further comprises defining a non-protected memory area for I/O buffers and I/O control structures of the guest (20) outside the area of the protected guest memory (22); starting the I/O process by the guest (20) using that non-protected area of the guest memory (22); the virtualization function (34) of the hypervisor-controlled system (10) generating a guest event; and the hypervisor (30) reading a reason for the guest event and performing the I/O process.

A guest integrity is further checked with a checking process. The checking process comprises knowing the guest key (24); the guest (20) reading a memory content in clear text from the protected guest memory (22) and transferring an arbitrary range of the protected guest memory (22) via a secure communication path to the checking process; requesting the same memory range of the protected guest memory (22) from the hypervisor (30) and transferring it to the checking process; comparing the memory content obtained from the guest (20) with the result of decrypting the memory content obtained from the hypervisor (30); delivering a comparison result depending on the contents of the two memory ranges; and the result of the checking process being positive if the comparison result equals zero, otherwise being negative.

Figure 4:
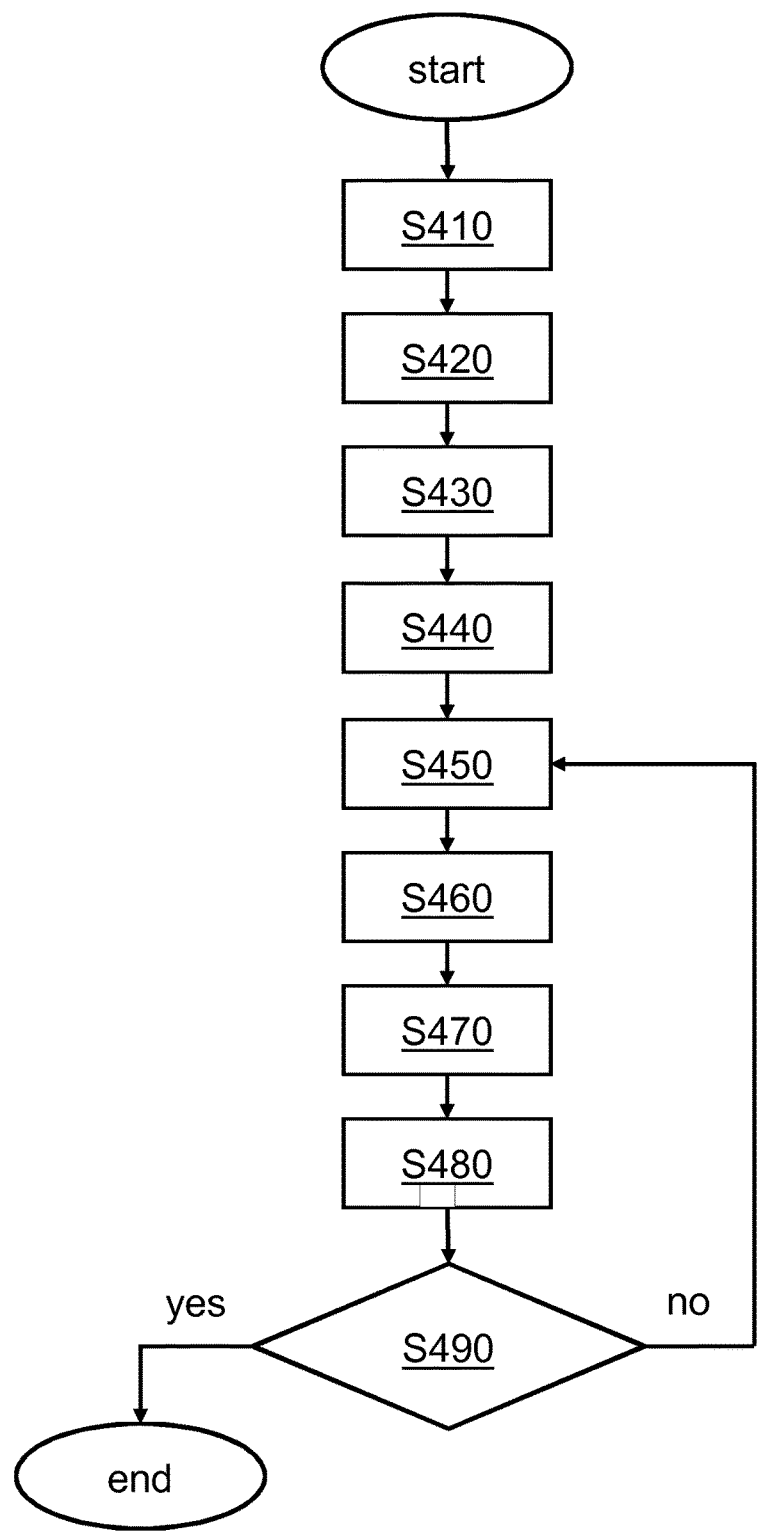
FIG. 4 depicts a generic flow chart for running a secure guest according to an embodiment of the invention.

In FIG. 4, a generic flow chart for executing a secure guest running according to an embodiment of the invention from a hypervisor (30) and CPU (216) view is shown. FIG. 4 as well as FIG. 5 reference objects defined in the diagrams of FIGS. 2 and 3, so the reference numerals used also are referencing the objects of these Figures. Running a secure guest (20) starts with step (S410), where the hypervisor (30)

reads an encrypted guest image from an initial program loader (IPL) device together with an encrypted guest key (24). Next, in step (S420), the hypervisor (30) stores the encrypted guest image into the protected guest memory (22). In step (S430), the hypervisor (30) prepares an initial guest state (52) that includes the encrypted guest key (24) and submits it to the firmware (70). Thus, the steps (S410) to (S430) serve to initialize a guest (20) in a hypervisor-controlled system (10). Next, in step (S440), the firmware (70) decrypts the protected guest memory (22), thus protecting the protected guest memory (22) from access by non-trusted components, e.g. the hypervisor (30) or other guests. In step (S450), a secure guest (20) virtual machine is started according to the current guest state (52). Following step (S460), a CPU (216) runs the secure guest (20) in a secure guest context (42) as described by the current guest state (52). In step (S470), if a guest event in the form of an interrupt or an instruction interception occurs, the guest (20) exits the guest context (42) with an updated guest state (52) due to this interrupt or interception. The hypervisor (30) is now able in at step (S480) to handle the interrupt or interception using a first firmware service to read data from the secure guest (20) or a second firmware service to write data to the secure guest (20).

Generally, a first firmware service may be triggered, meaning that the firmware (70) is processing information associated with the guest event and presenting only a subset of the information of the guest state (52) and the protected guest memory (22) to the hypervisor (30), and the firmware (70) is retaining a part of the information that is not being sent to the hypervisor (30). Further, based on the received subset of the information, the hypervisor (30) may be triggering a second firmware service for generating a state and/or memory modification of the guest (20), and for performing the state and/or memory modification associated with the guest event at the protected guest memory (22).

If the secure guest (20) is finished, at branch (S490) the whole process comes to an end. If the secure guest (20) is not finished, a loop to step (S450) is closed and the hypervisor (30) starts the secure guest (20) again.

Figure 5:
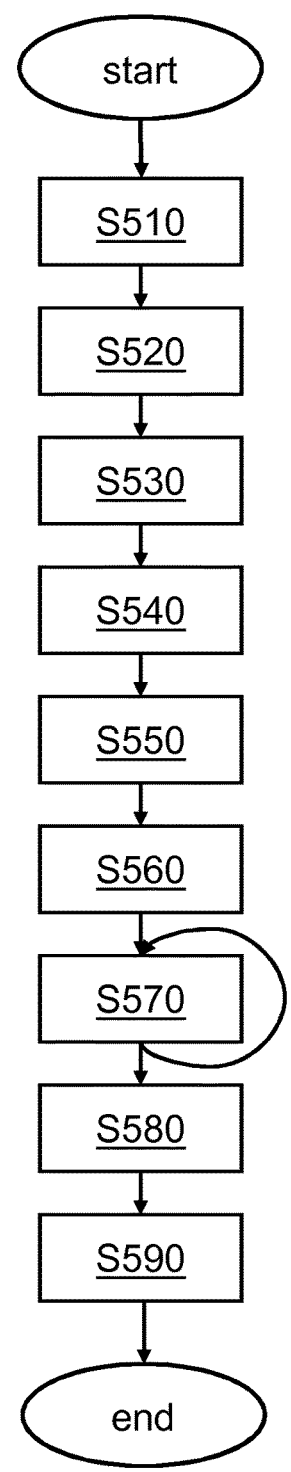
FIG. 5 depicts a detailed flow chart for interception handling with a secure guest running according to an embodiment of the invention.

In FIG. 5 a detailed flow chart for interception handling with a secure guest running according to an embodiment of the invention is depicted. Step (S510) starts with a guest event, meaning that the secure guest (20) is issuing an instruction which requests interpretation or support by the hypervisor (30), e.g., an instruction to store system environment parameters, which is usually provided by the hypervisor (30). In a next step (S520), the execution of the virtualization function (34) leaves the guest context (42) and passes initiative to a CPU-internal virtualization logic. Then, in step (S530), the CPU-internal virtualization logic detects a reason for exit of the guest (20), e.g., identifies instruction to store system environment parameters. In step (S540), the CPU-internal virtualization logic prepares handles for the hypervisor (30) to access input and output parameters according to the reason for exit of the guest 20, e.g., associates storage location for the requested information with a handle. Then in step (S550), the CPU-internal virtualization logic masks the part of the execution state not needed to process the interception and returns the initiative to the hypervisor (30), indicating the exit of the guest (20) and a hint to input and output parameter handles, e.g., hides registers and context data from the hypervisor (30), e.g. by encrypting them. The CPU-internal virtualization logic in steps (S520) to (S550) can alternatively be implemented as a first firmware service. Next, in step (S560), the hypervisor (30) detects the reason for the exit of the guest (20) by reading the reason indication from the CPU-internal virtualization logic, e.g., reads a reason code to identify a virtual server's request to store system environment parameters. The hypervisor (30) triggers in step (S570) (if necessary, repeatedly) firmware services (e.g. the first firmware service) to work with input and output parameters to process the exit of the guest (20). To perform this, the hypervisor (30) uses previously established handles as means to reference contents of the memory (230) and registers required for processing, e.g., the hypervisor (30) stores system environment parameters into the virtual server's memory through firmware services (e.g. the second firmware service) using the received handle.

By this way in the detailed flow chart for interception handling with a secure guest in FIG. 5 it is described how first and second firmware services are used for processing a guest event in a hypervisor-controlled system (10), how the firmware (70) is processing information associated with the guest event and presenting only a subset of the information to the hypervisor 30, as well as (iii) the firmware 70 is retaining a part of the information, and based on the received subset of the information the second firmware service may be triggered.

Next, in step (S580), the hypervisor (30) restarts virtualization function (34) execution by issuing an according CPU instruction, until in step (S590), the CPU-internal virtualization logic clears handles from the previous exit of the guest (20), unmasks the virtual server context for the virtualization function (34) execution and starts execution of the virtual server. Thus a state and/or memory modification of the guest (20) may be generated and performed at the guest memory 22 in encrypted form.

A method for processing a guest event in a hypervisor-controlled system is addressed exhibiting the advantage of protecting guest confidentiality. Thus, the method according to the invention generally describes securely managing virtual machines while maintaining privacy of virtual machine contents towards the hypervisor comprising one or more VMs each with resources including concealed memory and context data, a hypervisor managing VM resources and VM states, CPU assisted virtualization enforcing restricted access of the hypervisor to VM state/memory/context through firmware services.

The method according to the invention describes processing a guest event in a hypervisor-controlled system where guest data is encrypted with a guest key not accessible to the hypervisor and where CPUs and firmware are considered trusted and have access to the guest key when running in guest context. The firmware in this context particularly means system software implemented in a hardware based environment.

As said, the method according to the invention describes running virtual machines from protected memory such that the protected memory belonging to a specific virtual machine cannot be accessed by another virtual machine even if the hypervisor allowed such memory access. Also, the method prevents that a hypervisor can always fully inspect its guests, i.e. virtual machines/images, and read memory contents with potentially sensitive data. The advantage is that the described method does not use processes like authentication of a trust anchor with a (customer) key service. It is able to deal with interrupts or hypervisor intercepts. The described method does not require an attestation module (e.g. a TPM) on the CPU.

In an advantageous embodiment, particularly for enabling access to a memory page for the hypervisor, the method may further comprise (i) the hypervisor requesting access to a page of the protected guest memory from firmware; (ii) the firmware disabling access for the guest to that page; (iii) the firmware encrypting that page with the guest key; and (iv) the firmware enabling access for the hypervisor to that page.

Further, particularly for enabling access to a memory page for a guest, the method may favorably comprise (i) the hypervisor providing an encrypted page to the firmware; (ii) the firmware disabling access for the hypervisor to that page; (iii) the firmware decrypting that page; and (iv) the firmware enabling access for the guest to that page.

According to the above described embodiments, particularly for allowing decryption of a page, the method may advantageously comprise (i) the firmware computing an integrity value of the page to be encrypted and made accessible to the hypervisor; (ii) the hypervisor providing an encrypted page to be added to the protected pages of a virtual machine to the firmware; and (iii) the firmware only allowing adding the decrypted page to the protected pages of the virtual machine when the integrity value matches the page.

Further, particularly for a secure deployment and execution of a virtual machine, the method may advantageously comprise the steps (i) providing the guest with the guest key being encrypted with the public key associated with a private key of the hypervisor-controlled system for transfer to the key store of the hypervisor-controlled system; (ii) providing the hypervisor-controlled system with the private key, being stored in the hypervisor-controlled system and being used to decrypt the encrypted guest key; (iii) the guest key being used to encrypt and decrypt the guest data, when being transferred out of or into the protected guest memory. Thus a secure deployment and execution of a virtual machine in a hypervisor-controlled system may be enabled.

For encryption/decryption of guest data, the hypervisor controlled system may get a key pair; its private key may be stored in the trusted firmware or hardware, and may be used to decrypt guest keys. The public key may be used to encrypt (and transfer) the private guest key to the trusted firmware or hardware, in which the guest key may be stored and used securely.

The guest may generate a key as well. The guest key may be encrypted with the public key of the hypervisor controlled system before it is transferred to the hypervisor controlled system. The trusted firmware or hardware of the hypervisor controlled system may use this guest key to encrypt the guest's memory (but only when running the guest in the context of the CPU virtualization function). The guest key may also be used to deploy images from the guest in a Cloud environment.

Favorably, particularly for boot image generation and deployment, the method according to the invention may further comprise the steps (i) generating a boot image by a client or customer; (ii) encrypting the boot image with the guest key; (iii) transferring the encrypted boot image to a boot disk; (iv) loading the encrypted boot image of a guest by the hypervisor to the guest memory; (v) transforming the guest memory (23) into the protected guest memory (22); (vi) decrypting contents of the protected guest memory; (vii) starting an execution of a guest as a virtual machine at the CPU level, where the guest is defined by an area of an encrypted memory, an area of an unencrypted memory and an encrypted guest key. The guest key may be known only to the client and the guest respectively and the trusted firmware or hardware in guest context and for the transport to the trusted firmware or hardware the guest key may be encrypted with the public key associated with the private key of the hypervisor controlled system. It need not be known to a Cloud operator or the hypervisor.

The hypervisor may read contents of a boot image from the boot disk into the guest memory without relocation, where the boot disk contents may comprise a kernel, parameters, an initial ram disk. Loading the boot image may also comprise mounting a conventionally encrypted (e.g. via dm-crypt, a usually applied LINUX encrypting tool) root file system. Further the boot disk contents may comprise a kernel execution (kexec) environment that loads a new kernel from a conventionally encrypted target boot device.

The CPU architecture may be extended to provide a well-defined means to access a guest state, where access methods may provide the hypervisor only with the necessary information to perform its tasks (e.g. handling traps). However, the guest memory and register file may not be accessible outside of said access methods. Thus confidentiality of the guest may be protected, since the hypervisor cannot read a guest state or guest data entirely. The register file may not be accessible to the hypervisor directly, but may be stored away and restored through a hypervisor service. Other contexts than the guest itself may only see encrypted memory contents, as the hypervisor may not see the unencrypted guest memory. An area of the guest memory may remain unencrypted and unprotected in order to exchange data with the hypervisor or I/O devices. An I/O scratch area may be outside the protected memory area of the guest.

In an advantageous embodiment, particularly for an interaction between the virtual machine and the hypervisor, the method may further comprise the steps (i) keeping the range of the protected guest memory or registers associated with the guest event being not accessible to the hypervisor in decrypted form; (ii) extending a virtualization function of the hypervisor-controlled system by access methods to specific guest data associated with the guest event. This step may be advantageous for a hypervisor operation, but may not reveal data or code (other than reason and relevant parameters for instructions that trap) of the guest and enable to continue execution of the guest event. Some traps may be disabled entirely since they may only be meaningful (e.g. single stepping), when a hypervisor has full access to a guest.

Advantageously, particularly for an I/O process of a guest, the method may further comprise the steps (i) defining a non-protected memory area for I/O buffers and I/O control structures of the guest outside the area of the protected guest memory; (ii) starting the I/O process by the guest using that non-protected area of the guest memory; (iii) the virtualization function of the hypervisor-controlled system generating a guest event; (iv) the hypervisor reading a reason for the guest event and performing the I/O process. By putting the I/O buffers outside the protected guest memory, the hypervisor and I/O devices may have access to I/O control structures and data.

The hypervisor may store pages on a hypervisor owned swap device, where still the page contents may be encrypted. The CPU's virtualization function may trap, where the hypervisor may read a reason for the trap (e.g. "page fault") and may read a guest address. Then the hypervisor may put the page back to the same guest address, which maintains guest data integrity when encryption results are kept non-relocatable. Then, the hypervisor may restart the guest.

In an advantageous embodiment, particularly for establishing trust in the described method, the method may further comprise checking a guest integrity with a checking process that knows the guest key, the checking process comprising the steps (i) the guest reading a memory content in clear text from the protected guest memory transferring an arbitrary range of the protected guest memory via a secure communication path to the checking process; (ii) requesting the same memory range of the protected guest memory from the hypervisor and transferring it to the checking process; (iii) comparing the memory content obtained from the guest with the result of decrypting the memory content obtained from the hypervisor; (iv) delivering a comparison result depending on the contents of the two memory ranges; (v) returning the result of the checking process being positive if the comparison result equals zero, otherwise being negative. These method steps may be especially advantageous because the hypervisor is not able to read/inject code or data since it is not provided with the key for guest memory decryption/encryption.

According to a further advantageous embodiment, a data processing program for execution in a data processing system is proposed comprising an implementation of an instruction set for performing a method as described above when the data processing program is run on a computer.

Figure 6:
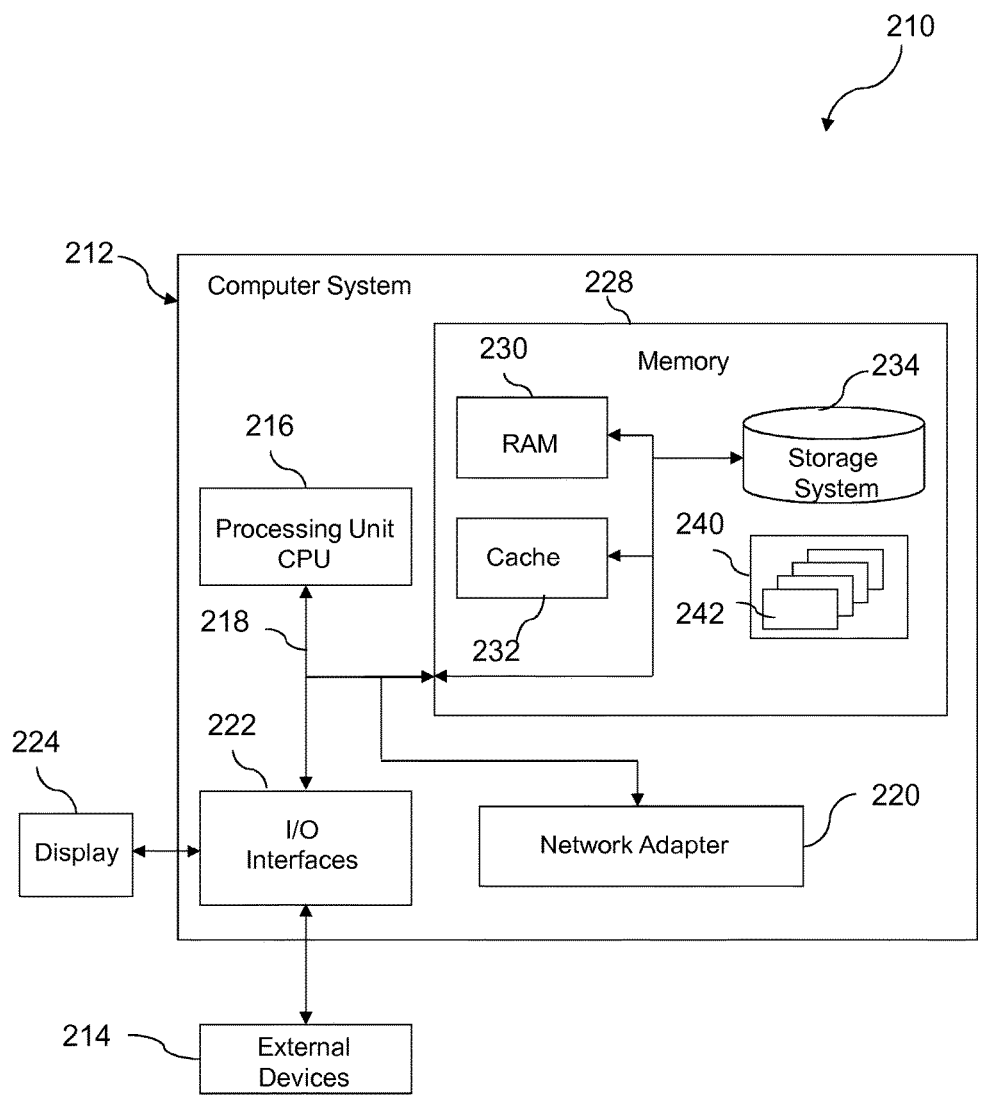
FIG. 6 depicts an example embodiment of a data processing system for carrying out a method according to the invention.

Referring now to FIG. 6, a schematic of an example of a data processing system (210) is shown. Data processing system (210) is only one example of a suitable data processing system and is not intended to suggest any limitation as to the scope of use or functionality of embodiments of the invention described herein. Regardless, data processing system (210) is capable of being implemented and/or performing any of the functionality set forth herein above.

In data processing system (210) there is a computer system/server (212), which is operational with numerous other general purpose or special purpose computing system environments or configurations. Examples of well-known computing systems, environments, and/or configurations that may be suitable for use with computer system/server (212) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server (212) may be described in the general context of computer system executable instructions, such as program modules, being executed by a computer system. Generally, program modules may include routines, programs, objects, components, logic, data structures, and so on that perform particular tasks or implement particular abstract data types. Computer system/server (212) may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 6, computer system/server (212) in data processing system (210) is shown in the form of a general-purpose computing device. The components of computer system/server (212) may include, but are not limited to, one or more processors or processing units (216), a system memory (228), and a bus (218) that couples various system components including system memory (228) to processor (216).

Bus (218) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server (212) typically includes a variety of computer system readable media. Such media may be any available media that is accessible by computer system/server (212), and it includes both volatile and non-volatile media, removable and non-removable media.

System memory (228) can include computer system readable media in the form of volatile memory, such as random access memory (RAM) (230) and/or cache memory (232). Computer system/server (212) may further include other removable/non-removable, volatile/non-volatile computer system storage media. By way of example only, storage system (234) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (218) by one or more data media interfaces. As will be further depicted and described below, memory (228) may include at least one program product having a set (e.g., at least one) of program modules that are configured to carry out the functions of embodiments of the invention.

Program/utility (240), having a set (at least one) of program modules (242), may be stored in memory (228) by way of example, and not limitation, as well as an operating system, one or more application programs, other program modules, and program data. Each of the operating system, one or more application programs, other program modules, and program data or some combination thereof, may include an implementation of a networking environment. Program modules (242) generally carry out the functions and/or methodologies of embodiments of the invention as described herein. Computer system/server (212) may also communicate with one or more external devices (214) such as a keyboard, a pointing device, a display (224), etc.; one or more devices that enable a user to interact with computer system/server (212); and/or any devices (e.g., network card, modem, etc.) that enable computer system/server (212) to communicate with one or more other computing devices. Such communication can occur via Input/Output (I/O) interfaces (222). Still yet, computer system/server (212) can communicate with one or more networks such as a local area network (LAN), a general wide area network (WAN), and/or a public network (e.g., the Internet) via network adapter (220). As depicted, network adapter (220) communicates with the other components of computer system/server (212) via bus (218). It should be understood that although not shown, other hardware and/or software components could be used in conjunction with computer system/server (212). Examples, include, but are not limited to: microcode, device drivers, redundant processing units, external disk drive arrays, RAID systems, tape drives, and data archival storage systems, etc.

As disclosed, a computer program product is proposed comprising a computer usable medium including a computer readable program, wherein the computer readable program when executed on a computer causes the computer to perform a method for processing a guest event in a hypervisor-controlled system, comprising: the guest event triggering a first firmware service being specific for the guest event in a firmware, the guest event being associated with a guest and with a guest state and a protected guest memory accessible only by the guest and the firmware, and a guest key; the firmware processing information associated with the guest event, comprising information of the guest state and the protected guest memory, and presenting only a subset of the information of the guest state and the protected guest memory to a hypervisor, wherein the subset of the information is selected to suffice for the hypervisor to process the guest event; the firmware retaining a part of the information of the guest state and the protected guest memory that is not being sent to the hypervisor; the hypervisor processing the guest event based on the received subset of the information of the guest state and the protected guest memory and sending a process result to the firmware triggering a second firmware service being specific for the guest event; the firmware processing the received process result together with the part of the information of the guest state and the protected guest memory that was not sent to the hypervisor, generating a state and/or memory modification; the firmware performing the state and/or memory modification associated with the guest event at the protected guest memory.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments are described with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect, a data processing system for execution of a data processing program is proposed, comprising software code portions for performing a method described above.

The block diagrams in the figures illustrate the architecture, functionality, and operation of possible implementations of systems, methods and computer program products according to various embodiments. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

We claim:

1. A method for processing a guest event in a hypervisor-controlled system, comprising:
   triggering, by the guest event, a first firmware service specific in firmware for the guest event, wherein the guest event is associated with a guest, a guest key, and with a guest state and a protected guest memory accessible only by the guest and the firmware;
   processing, by the firmware, information associated with the guest event, wherein the information comprises information of the guest state and the protected guest memory;
   receiving, by a hypervisor, a subset of the processed information, wherein the subset is selected to be sufficient for the hypervisor to process the guest event;
   retaining, by the firmware, a non-received portion of the information;
   processing, by the hypervisor, the guest event based on the received subset, and sending a result from the processing, by the hypervisor, the guest event based on the received subset, to the firmware triggering a second firmware service specific in the firmware for the guest event;
   processing, by the firmware, the result from the processing, by the hypervisor, the guest event based on the received subset together with the retained information to generate a modification associated with the guest event;
   performing, by the firmware, the generated modification at the protected guest memory;
   computing, by the firmware, an integrity value of a page to be encrypted; and
   limiting, by the firmware, adding a decrypted page to protected pages of the guest when the integrity value matches the page.

2. The method of claim 1, further comprising:
   requesting, by the hypervisor, access to a first page of the protected guest memory from firmware;
   disabling, by the firmware, access for the guest to the first page;
   encrypting, by the firmware, the first page with the guest key; and
   enabling, by the firmware, access for the hypervisor to the first page.

3. The method of claim 2, further comprising:
   providing, by the hypervisor, an encrypted page to the firmware;
   disabling, by the firmware, access for the hypervisor to the encrypted page;
   decrypting, by the firmware, the encrypted page; and
   enabling, by the firmware, access for the guest to the decrypted page.

4. The method of claim 1, further comprising:
   providing the guest with the guest key;
   encrypting the guest key with a public key, wherein the public key is associated with a private key of the hypervisor-controlled system for transfer to a key store of the hypervisor-controlled system;
   providing the hypervisor-controlled system with the private key, wherein the private key is stored in the hypervisor-controlled system, and wherein the private key is used to decrypt the encrypted guest key; and
   using the guest key to encrypt and decrypt guest data in response to the guest data being transferred out of or into the protected guest memory, respectively.

5. The method of claim 1, further comprising:
   generating a boot image by a client;
   encrypting the boot image with the guest key;
   transferring the encrypted boot image to a boot disk;
   loading the encrypted boot image of a guest by the hypervisor to guest memory;
   transforming the guest memory into the protected guest memory;
   decrypting contents of the protected guest memory; and
   starting an execution of the guest.

6. The method of claim 1, further comprising:
   keeping a range of the protected guest memory associated with the guest event inaccessible to the hypervisor in decrypted form;
   extending a virtualization function of the hypervisor-controlled system by an access method to specific guest data associated with the guest event.

7. The method of claim 1, further comprising:
   defining a non-protected memory area for I/O buffers and I/O control structures of the guest outside the area of the protected guest memory;
   starting the I/O process by the guest using the non-protected area of the guest memory;
   generating, by a virtualization function, a guest event;
   reading, by the hypervisor, a reason for the guest event; and
   performing the I/O process.

8. The method of claim 1, further comprising checking a guest integrity with a checking process comprising:
   reading, by the guest, first memory content in clear text from the protected guest memory;
   transferring second memory content of the protected guest memory via a secure communication path to the checking process;
   requesting the second memory content from the hypervisor, and transferring the second memory content to the checking process;
   decrypting the second memory content; and
   comparing the first memory content with the decrypted second memory content, and delivering a result of the comparison.

* * * * *